United States Patent [19]

Nusche

[11] Patent Number: 5,669,416
[45] Date of Patent: Sep. 23, 1997

[54] SERVO-VALVE

[75] Inventor: Georg Nusche, Berlin, Germany

[73] Assignee: Siemens Aktiengesellschaft, München, Germany

[21] Appl. No.: 564,060

[22] PCT Filed: Jun. 10, 1994

[86] PCT No.: PCT/DE94/00685

§ 371 Date: Feb. 26, 1996

§ 102(e) Date: Feb. 26, 1996

[87] PCT Pub. No.: WO95/00786

PCT Pub. Date: Jan. 5, 1995

[30] Foreign Application Priority Data

Jun. 18, 1993 [DE] Germany .................. 43 20 909.2

[51] Int. Cl.⁶ .................. F15B 13/044; F16K 31/02
[52] U.S. Cl. .................. 137/625.44; 137/625.65; 251/129.06
[58] Field of Search .................. 137/625.44, 625.65; 251/129.06

[56] References Cited

U.S. PATENT DOCUMENTS 3,638,973  2/1972  Poletti .................. 285/184
5,163,463  11/1992  Gassman et al. .................. 251/129.06 X

FOREIGN PATENT DOCUMENTS 86 07 094 U  11/1989  Germany .
63-101588    5/1988   Japan .................. 251/129.06
2 134 223    8/1984   United Kingdom .

OTHER PUBLICATIONS

Fluid, (Hydraulik Pneumatik Elektronik) Apr. 1989, pp. 34 & 37: Der Piezo–Pillen–Knick.

Primary Examiner—Gerald A. Michalsky
Attorney, Agent, or Firm—Kenyon & Kenyon

[57] ABSTRACT

A servo-valve includes a tongue-like piezo-ceramic flexible transducer, which is firmly clamped at one end and can be moved at the other by the application of an electric voltage from a position blocking an air inlet nozzle into one that blocks an air outlet nozzle. To design such a servo-valve in such a way that the effects of distortions of the flexible transducer caused by mechanical and thermal effects can be automatically compensated, one end of the tongue-like flexible transducer is firmly secured to a spindle extending transversely to the flexible transducer. The spindle has a controllable securing device which is released once the voltage is no longer being applied during the return movement of the free end of the flexible transducer towards the air inlet nozzle.

17 Claims, 1 Drawing Sheet

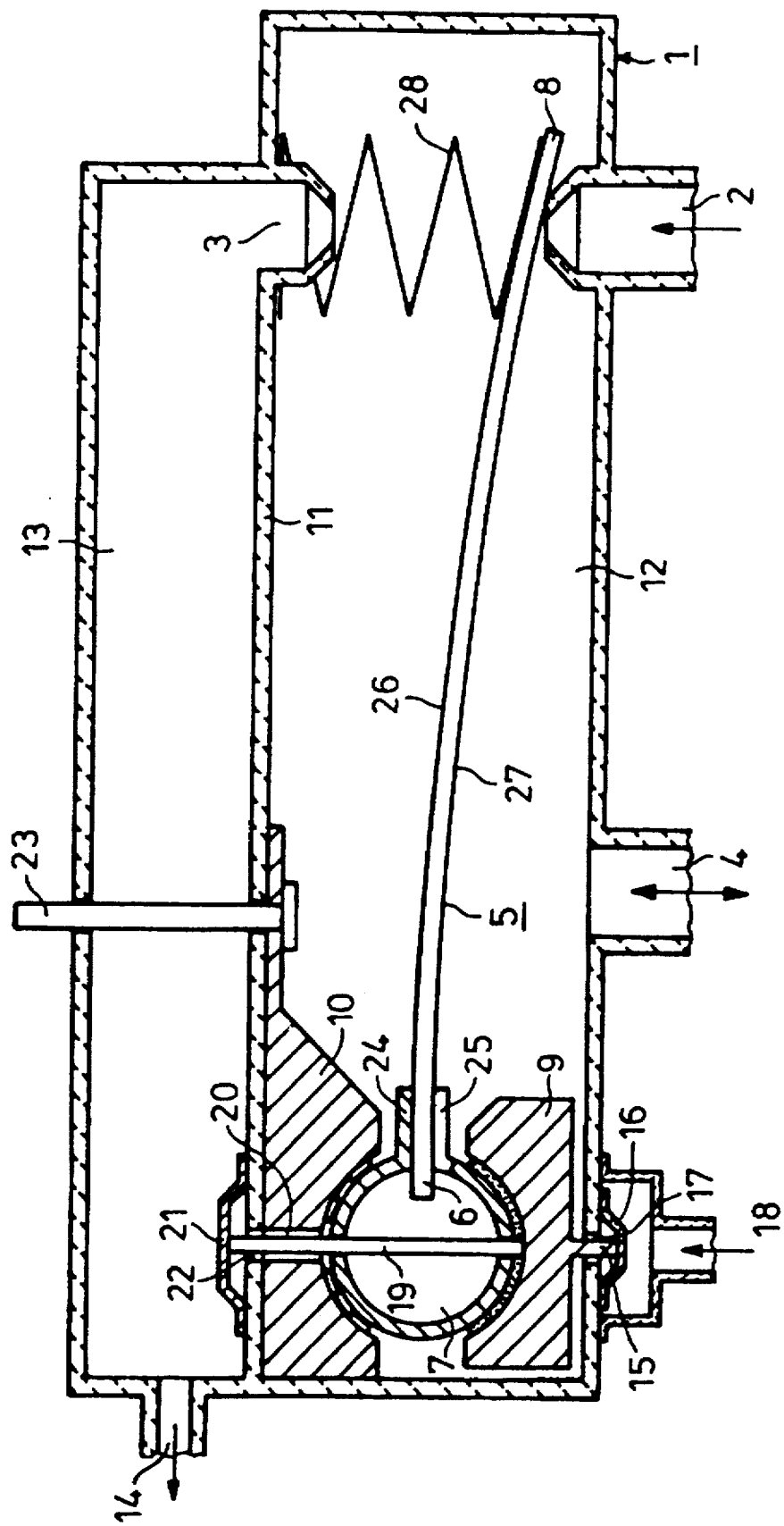

SERVO-VALVE

BACKGROUND OF THE INVENTION

The present invention relates generally to servo-valves, and more particularly to a servo-valve with a tongue-like piezo-ceramic flexible transducer, which is firmly clamped at one end and can be moved at the other end by the application of an electric voltage. The movement of the flexible transducer moves the transducer from a position blocking an air inlet nozzle of the servo-valve into one that blocks an air outlet nozzle. The movement of the flexible transducer is opposed by a resetting spring.

An article in "Fluid" journal, April 1989, pages 34 and 37, discloses a servo-valve of this type, in which the flexible transducer is housed in an enclosure which has, besides an air inlet nozzle and an air outlet nozzle, an outlet to an actuating element of a main valve. In the enclosure of the known servo-valve, driver electronic circuitry is also provided, which provides an electric voltage to the flexible transducer in response to a switching pulse. The flexible transducer of the known servo-valve consists of two polarized layers joined to one another, which bend when an electric voltage is applied because the materials of these layers are chosen such that different deformations occur due to the piezoelectric effect. The flexible transducer of the known servo-valve is, in mechanical terms, a bending bar that is firmly clamped at one end, which can block the air inlet nozzle or the air outlet nozzle of the servo-valve with its other free end depending on how it is driven.

The tongue-like flexible transducer of the known servo-valve is subject not only to the risk of a permanent pre-bending in the rest state due to the constant loading on the transducer by the resetting spring, but is also affected by temperature. These influences can be so intense that the flexible transducer under some circumstances no longer works properly after a certain period of time. Accordingly, in a specific embodiment of the known servo-valve, the flexible transducer is not clamped absolutely firmly at one end but rather so as to allow readjustment of the flexible transducer in the area of its clamped end.

The present invention is therefore directed to the problem of developing a servo-valve having a tongue-like piezo-ceramic flexible transducer, in which mechanical and thermal influences on the bending behavior of the flexible transducer are automatically compensated.

SUMMARY OF THE INVENTION

The present invention solves this problem by providing that, in a servo-valve of the type specified in the introduction, one end of the tongue-like flexible transducer is firmly secured to a spindle that extends transversely to the flexible transducer. The spindle is provided with a controllable securing device that is released once the voltage is no longer being applied during the return movement of the free end of the flexible transducer towards the air inlet nozzle.

The essential advantage of the servo-valve according to the present invention consists in that the controllable securing device makes it possible for the flexible transducer to move with its free end to the air inlet nozzle under the influence of the resetting spring despite any possible internal stresses in each case after the application of an electric voltage, in that during this return movement of the free end of the flexible transducer, a rotating motion about the spindle occurs. The flexible transducer thus lies down with its free end against the air inlet nozzle once the electric voltage is no longer being applied and is not influenced by any internal pre-stresses solely under the action of the resetting spring, with a repositioning of the flexible transducer taking place in this manner each time. Afterwards, due to appropriate driving of the securing device, the spindle is secured by the securing device in the position assumed in each case upon termination of the return movement of the free end of the flexible transducer. From this position, a movement of the free end of the flexible transducer to the air outlet nozzle then takes place due to bending the next time a voltage is applied. Positional correction of the flexible transducer through adjustment is no longer necessary; the means for adjustment are not required.

In the servo-valve according to the present invention, the securing device can be designed in different ways only as long as it is capable of securing the spindle joined to the flexible transducer in a controlled manner. However, it is seen as being particularly advantageous with regard to ease of manufacture if the securing device has a bearing and a movable brake shoe between which the spindle runs.

The actuation of the securing device can take place in different manners; for example, it seems possible to control the brake shoe electrically or rather electromagnetically so that in each case once the voltage is no longer being applied, the brake shoe is released by an electric pulse until the free end of the flexible transducer lies once again in front of the air inlet nozzle. With regard to cost-effective manufacture of the servo-valve according to the present invention, however, it is deemed advantageous if the brake shoe is suspended between a brake membrane and a resetting membrane and if the brake membrane closes an opening in an outer wall of the servo-valve with respect to the interior chamber of the valve and has a pressure applied to it; the resetting membrane blocks a hole in an intermediate wall that separates the interior chamber from an air outlet channel emanating from the air outlet nozzle. The air outlet channel is provided with a throttling air outlet opening. In this specific embodiment of the securing device, it is advantageous to use as the pressure the regulated pre-pressure, which is generally present at the air inlet nozzle in a servo-valve of this type.

With regard to particularly reliable operation of the securing device, it is seen as advantageous if the brake shoe is fastened on one side directly to the brake membrane and on the other side via a connecting link extending through the spindle and the bearing to the resetting membrane. In this case, a deflection of the resetting membrane acts directly on the brake shoe, the securing device being released quickly and reliably as a result when the air outlet nozzle is opened.

The feeding of the electric voltage to the two sides of the flexible transducer can take place in different manners in the servo-valve according to the present invention; however, it is deemed advantageous if the bearing is designed as a contact spring arrangement for applying a voltage and the spindle has at least two conductive regions, electrically insulated from one another, by way of which the contact spring arrangement can be galvanically connected to the two sides of the flexible transducer. The two conductive regions can be formed, for example, by conductive coatings, insulated from one another, which are applied externally on the spindle insofar as the spindle is an insulating part. In the case of a metallic spindle, a division should be made, and the two parts should be separated from one another by insulating layers.

BRIEF DESCRIPTION OF THE DRAWING

The sole FIGURE depicts an enlarged schematic representation of a section through an exemplary embodiment of the servo-valve according to the present invention.

DETAILED DESCRIPTION

The servo-valve shown has an enclosure 1, which is provided with an air inlet nozzle 2 and an air outlet nozzle 3. Moreover, via a further nozzle 4, it is possible to pressurize an actuating element of a main valve not shown.

Within the enclosure 1, a tongue-like, piezo-ceramic flexible transducer 5 is present, which is firmly joined at one end 6 to a spindle 7, i.e., it is firmly clamped there. The other free end 8 of the flexible transducer 5 is movable back and forth between the air inlet nozzle 2 and the air outlet nozzle 3, as will be explained later.

The spindle 7 is supported freely between a brake shoe 9 and a bearing 10. The bearing 10 is firmly attached to an intermediate wall 11 that separates the interior chamber 12 of the enclosure 1 from an air outlet channel 13, which emanates from the air outlet nozzle 3. The air outlet channel 13 is provided at its end away from the air outlet nozzle 3 with an air outlet opening 14, which has a throttling effect due to its dimensions.

As can also be seen in the FIGURE, the brake shoe 9 is fastened via a small lug 15 directly to a brake membrane 16, which blocks an opening 17 in the enclosure 1. The brake membrane 16 is subjected via a supply line 18 to a regulated pre-pressure which is provided by the servo-valve in a manner not shown. The regulated pre-pressure is constantly present at the brake membrane 16 such that a pressure of the brake shoe 9 is exerted in the direction of the spindle 7 by this brake membrane 16. The brake shoe 9 is joined to a resetting membrane 21 via a connecting link 19 that loosely crosses through the spindle 7 and is also freely run through a passage hole 20 in the bearing 10. The resetting membrane 21 blocks a hole 22 in the intermediate wall 11. The brake shoe 9 is thus suspended to a certain extent between the brake membrane 16 and the resetting membrane 21.

The bearing 10 is designed as a contact spring arrangement and consists of two contact springs arranged behind one another in the FIGURE; an electric voltage is applied via a terminal post 23. A further terminal post is located in the FIGURE behind the terminal post 23. The contact springs are connected galvanically via conductive coatings 24 and 25 to the top side 26 or rather the top layer, not shown, of the flexible transducer 5 and to the bottom side 27 or rather the bottom layer, not shown, of the flexible transducer 5.

A resetting spring 28 ensures that when no electric voltage is applied, the flexible transducer 5 is pressed with its free end 8 against the air inlet nozzle 2, which it keeps blocked. When a voltage is applied, the free end 8 of the flexible transducer 5 is moved in opposition to the force of the resetting spring 28 against the air outlet nozzle 3, which it then closes such that the air entering in this operating state can flow via the opening 4 to the actuating element of the main valve.

The servo-valve shown in the FIGURE works as detailed hereafter: If no voltage is applied to the servo-valve via the terminal post 23, i.e., the servo-valve is in its state of rest, then the flexible transducer 5 assumes the position shown in the FIGURE, i.e., it blocks the air inlet nozzle 2 with its free end 8. In this state, the brake shoe 9 is also pressed against the spindle 7 because the regulated pre-pressure acts on the brake membrane 16 via the supply line 18. The spindle 7 is thus pressed against the bearing 10, resulting in an electric contact closure between the conductive regions 24 and 25 and the bearing 10.

If an electric voltage is applied to the servo-valve, the flexible transducer 5 then bends upwards, and the free end 8 of the flexible transducer 5 blocks the air outlet nozzle 3; the main valve, not shown, is actuated via the opening 4. If the voltage supply via the terminal post 23 is terminated, then the deflection of the flexible transducer 5 subsides and the free end 8 is guided by the resetting spring 28 against the air inlet nozzle 2. Air simultaneously escapes via the air outlet nozzle 3 and the air outlet opening 14, which air, however, is blocked in the air outlet channel 13 due to momentary formation of a blocking pressure. The blocking pressure results, due to appropriate dimensioning of the resetting membrane 21, in the actuation of the resetting membrane 21. The brake shoe 9 is momentarily released as a result, and the spindle 7 can freely rotate with the flexible transducer 5. The flexible transducer 5 thus places itself freely against the air inlet nozzle and is thus repositioned. Possible internal distortions of the flexible transducer 5 due to mechanical and thermal influences are compensated in this manner. Once the blocking pressure in the air outlet channel 13 is removed, the brake shoe 9 lies down once again, under the influence of the brake membrane 16 subjected to the regulated pre-pressure, against the spindle 7 which it presses against the bearing 10 in a securing manner. The bending procedure starts anew when an electric voltage is reapplied.

I claim:

1. A servo-valve composing:
   a) an air inlet nozzle;
   b) an air outlet nozzle;
   c) a resetting spring;
   d) a spindle;
   e) a controllable securing device for securing the spindle;
   f) a tongue-like piezo-ceramic flexible transducer having a first end firmly secured to the spindle which extends transversely to the flexible transducer, and having a second end that is movable by application of an electric voltage from a first position blocking the air inlet nozzle of the servo-valve into a second position that blocks the air outlet nozzle, wherein said resetting spring opposes movement of the transducer from the first position to the second position; and
   g) means for releasing the controllable securing device from the spindle when the application of the electric voltage is reduced.

2. The servo-valve according to claim 1, wherein the securing device further comprises a bearing and a movable brake shoe between which the spindle runs.

3. The servo-valve according to claim 2, further comprising:
   a) an air outlet channel emanating from the air outlet nozzle, and having a throttling air outlet opening; and
   b) an interior chamber having an outer wall with a hole and an intermediate wall separating the interior chamber from the air outlet channel, wherein the securing device further comprises a brake membrane and a resetting membrane between which the brake shoe is suspended, the brake membrane closes the opening in the outer wall of the servo-valve with respect to the interior chamber and has a pressure applied to it, and the resetting membrane blocks the hole in the intermediate wall.

4. The servo-valve according to claim 3, wherein the securing device further comprises a bearing and a connecting link, which extends through the spindle, and the brake shoe is fastened on one side directly to the brake membrane and on the other side via the connecting link and the bearing to the resetting membrane.

5. The servo-valve according to claim 4, wherein the bearing is designed as a contact spring arrangement for applying a voltage and the spindle further comprises at least two conductive regions electrically insulated from one another, by way of which the contact spring arrangement can be galvanically coupled to both sides of the flexible transducer.

6. The servo-valve of claim 1, further comprising:

h) means for securing the controllable securing device to the spindle after the controllable securing device has been released.

7. A servo-valve comprising:

a) an air inlet nozzle;

b) an air outlet nozzle;

c) a resetting spring;

d) a spindle;

e) a controllable securing device for securing the spindle;

f) a tongue-like piezo-ceramic flexible transducer having a first end firmly secured to the spindle which extends transversely to the flexible transducer, and having a second end that is movable by application of an electric voltage from a first position blocking the air inlet nozzle of the servo-valve into a second position that blocks the air outlet nozzle, wherein said resetting spring opposes movement of the transducer from the first position to the second position; and g) means for releasing the controllable securing device from the spindle when the application of the voltage ends.

8. The servo-valve of claim 7, further comprising:

h) means for securing the controllable securing device to the spindle after the controllable securing device has been released.

9. A servo-valve comprising:

a) an air inlet nozzle;

b) an air outlet nozzle;

c) a resetting spring;

d) a spindle;

e) a controllable securing device for securing the spindle;

f) a tongue-like piezo-ceramic flexible transducer having a first end firmly secured to the spindle which extends transversely to the flexible transducer, and having a second end that is movable by application of an electric voltage from a first position blocking the air inlet nozzle of the servo-valve into a second position that blocks the air outlet nozzle, wherein said resetting spring opposes movement of the transducer from the first position to the second position; and g) means for releasing the controllable securing device from the spindle when the tongue-like piezo-ceramic flexible transducer leaves the second position.

10. The servo-valve of claim 9, further comprising:

h) means for securing the controllable securing device to the spindle after the controllable securing device has been released.

11. The servo-valve of claim 9, further comprising:

h) means for forming a blocking pressure when the tongue-like piezo-ceramic flexible transducer leaves the second position;

the means for releasing the controllable securing device from the spindle when the tongue-like piezo-ceramic flexible transducer leaves the second position includes means for releasing the spindle after the blocking pressure is formed.

12. The servo-valve of claim 11, further comprising:

j) means for securing the controllable securing device to the spindle after the blocking pressure ceases.

13. A servo-valve comprising:

a) an air inlet nozzle;

b) an air outlet nozzle;

c) a resetting spring;

d) a moveable brake shoe;

e) a bearing;

f) a spindle running between the moveable brake shoe and the bearing; and g) a tongue-like piezo-ceramic flexible transducer having a first end firmly secured to the spindle which extends transversely to the flexible transducer, and having a second end that is movable by application of an electric voltage from a first position blocking the air inlet nozzle of the servo-valve into a second position that blocks the air outlet nozzle, wherein said resetting spring opposes movement of the transducer from the first position to the second position.

14. The servo-valve of claim 13, wherein the brake shoe and the bearing release the spindle when the tongue-like piezo-ceramic flexible transducer leaves the second position.

15. The servo-valve of claim 14, wherein the brake shoe and the bearing secure the spindle after the spindle is released.

16. The servo-valve of claim 13, further comprising:

h) means for forming a blocking pressure when the tongue-like piezo-ceramic flexible transducer leaves the second position; and i) means for releasing the spindle after the blocking pressure is formed.

17. The servo-valve of claim 16, further comprising:

j) means for securing the spindle after the blocking pressure ceases.

* * * * *